United States Patent [19]

Asplund et al.

[11] Patent Number: 5,296,764
[45] Date of Patent: Mar. 22, 1994

[54] REDUCTION OF DISTURBANCES IN A POWER NETWORK

[75] Inventors: Gunnar Asplund, Ludvika; Henrik Breder, Västerås; Anders Aberg, Staffanstorp, all of Sweden

[73] Assignee: Asea Brown Boveri AB, Västerås, Sweden

[21] Appl. No.: 961,631

[22] Filed: Oct. 16, 1992

[30] Foreign Application Priority Data

Nov. 4, 1991 [SE] Sweden .................. 9103229

[51] Int. Cl.$^5$ .................................... H02M 7/02
[52] U.S. Cl. .................... 307/521; 363/35; 363/51
[58] Field of Search ............ 307/261, 296.6, 491, 307/520, 521; 328/162, 167; 363/35, 51

[56] References Cited

U.S. PATENT DOCUMENTS 3,863,134  1/1975  Pollard .................... 363/35
4,639,848  1/1987  Sakai ...................... 363/51

FOREIGN PATENT DOCUMENTS 0301483  2/1989  European Pat. Off.
WO81/00638  3/1981  PCT Int'l Appl.

OTHER PUBLICATIONS

IEEE Trans Pwr Delivery, vol. 4; No. 4; Oct. 1989; "Feasibility Study of AC-DC Side Active Filters for HVDC Converter Terminals"; Wong et al.
Control System Design-An Introduction to State-Space Methods, Friedland, pp. 78, 144 and 188; McGraw-Hill Book Company 1987.
Modern Control Systems; Fourth Ed.; Dorf; pp. 262-264; Addison-Wesley Publishing Company 1986.

Primary Examiner—Richard A. Bertsch
Assistant Examiner—David W. Scheuermann
Attorney, Agent, or Firm—Watson, Cole, Grindle & Watson

[57] ABSTRACT

A method and a device in an electric power network (1), comprising an active filter (4) controllable via a control input (41), for reducing disturbances generated by a disturbance source (6) located in and/or connected to the power network. A control member (8) is adapted, in dependence on the control deviation (DU) from a desired value (Y2iR) of at least one state variable (Y2i) sensed in the power network (1), to generate a control signal (C1) which is supplied to the control input (41). The control member (8) is adapted to transform the control deviation (DU) in a filter device (93) with a transfer function (FI) which simulates the inverse of the transfer function (F1') from the control signal (C1) to the control deviation (DU) and/or to filter the output signal of the controller in a filter device (943, 953, 956) without any phase shift. (FIGS. 1 and 10)

49 Claims, 10 Drawing Sheets

REDUCTION OF DISTURBANCES IN A POWER NETWORK

TECHNICAL FIELD

The present invention relates to a method and a device in an electric power network comprising an active filter, controllable via a control input, for reducing disturbances generated by a disturbance source located in the power network and/or connected thereto. The power network may, for example, consist of a network for transmission of high-voltage direct current connected to an a.c. network by means of a static converter.

BACKGROUND ART

Non-linear elements give rise to disturbances in the form of harmonics in the power networks to which they are connected. Thus, for example, by its operating principle comprising the cyclic connections of different parts of the alternating voltage via the valves included in the convertor, a convertor connected to an a.c. network generates harmonic currents on its a.c.side and harmonic voltages on its d.c. side. During the time intervals between the commutations, however, the convertor may be regarded as a linear element and the currents and voltages arising in the power network may therefore, during the above-mentioned time intervals, be determined from a linear model based on the knowledge of the phase position and the amplitude of the applied voltage as well as on the impedance and initial state of the network. Further, the cyclic connections impart to the currents and voltages arising waveforms which, during a steady state, are repeated for the respective time interval. In principle, only harmonics of the order $n=kp\pm1$ occur on the a.c. side and of the order $n=kp$ on the d.c. side, where p is the pulse number of the converter and k is a positive integer.

To reduce the stresses, originating from the harmonics, on the components included in the power network and to fulfill the requirements made on the effect of the harmonics on the network, therefore, filters are generally required to limit the propagation of the disturbances in the power network. Especially in plants for transformation between alternating current and high voltage direct current, where there are also placed demands for limitation of telecommunications disturbances emanating from the lines, extensive installations for filtering the generated harmonics are required. These filters are generally built up from passive components and are tuned to the harmonics of a lower order whereas the harmonics of a higher order are filtered through a high-pass filter. When calculating the passive filters, factors such as resonances with the impedance of the network—which impedance is dependent on the network configuration—are also taken into account. The fact that the passive filters, installed on the a.c. side, are also to serve as members for generating reactive power is also taken into account.

Drift at mains frequency and in component values means that an exact tuning generally cannot be maintained, and also at the resonance frequency the filter impedance will not always be negligible as compared to the network impedance. In practice, therefore, harmonics remain in the network and to this is to be added the fact that during the actual commutations and due to any phase unsymmetries, harmonics of other numbers of order than those mentioned above are also normally generated.

The above mentioned limitations of the passive filters have therefore led to proposals for the use of active filters instead, whereby the network via these filters are supplied with currents or voltages counteracting those which are generated by the disturbance source. By measuring the remaining harmonic contents in the power network, the supplied currents or voltages can then, in principle, be given such waveforms that they completely eliminate the harmonic contents of the network. Thus, in the IEEE publication 89 WM 123-1 PWRD (IEEE/PES 1989 Winter Meeting, New York 1989): Cheuksum Wong, Ned Mohan, Selwyn E. Wright and Karl N. Mortensen: Feasibility Study of AC- and DC-Side Active Filters for HVDC Converter Terminals, there is given a technical and economic evaluation of a device comprising a controllable current generator which is intended to be connected between line and ground in an HVDC station. The evaluation is based on calculations and on simulations of the device connected to the direct voltage side. The results indicate a good technical effect, but as far as is clear from the report the simulations have been performed only for steady states while considering harmonics of the orders 12, 24 and 36. Further, a greatly simplified model of the converter has been used and the effect of the direct voltage line has been neglected. By this approach it has been possible to calculate, based on the model, the reference value of the current which, via the current generator, is to be supplied to the network to eliminate the harmonics considered, and this reference value has then been used during the simulations. The report indicates a method of controlling the current generator of the active filter by harmonic analysis of the direct voltage at the converter and, by feedback via PI regulators, forming a reference value for the current generator such that the contents of harmonics of the above-mentioned three orders in the direct voltage are controlled towards zero.

As mentioned above, the connected power network shows an impedance with several resonance frequencies, and in fact, in view of the complicated characteristics in the frequency domain of an extended power network, control systems based only on feedback are likely to involve difficult dimensioning problems.

Essentially, the control problem is caused by the non-minimum phase behaviour of the transfer functions of the electric power network. The physical reason for this behaviour are electromagnetic waves travelling along the power lines and their reflections at points with changes in the impedance characteristics. This implies multiple transportation delay effects (echoes) on control responses of the electric power network as the natural damping effect on travelling waves is very low.

It is well known from text books in control theory, for example Bernard Friedland, Control System Design, McGraw-Hill International Editions, 1987, ISBN 0-07-100420-3, pp. 78, 144, 188, note 4.7, and Richard C. Dorf, Modern Control Systems, Addison-Wesley publishing Company, Fourth Edition, 1986, ISBN 0-201-05326-8, pp. 262-264, that non-minimum phase implies zeroes in the righthand part of the complex s-plane and it is also impossible to make stable feedback control with very quick response for non-minimum phase systems.

The need to reduce disturbances with a certain frequency content also exists in other physical processes, and methods for this have also been published on several occasions. Thus, PCT application PCT/GB80/00128 (WO 81/00638) discloses a method for reduction of acoustic disturbances, or more generally vibrations in gases, liquids, or solids, in which the periodic character of a disturbance source is utilized in such a way that a signal stored in a memory member is applied, repetitively and synchronized from the disturbance source, to a loudspeaker placed at a location where the disturbance is to be reduced. The acoustic pressure generated by the loudspeaker is given such an amplitude and such a phase position that it tends to extinguish the original disturbance. The desired cancellation of the disturbance is thereby obtained in such a way that the resultant acoustic pressure is sensed by a microphone whereupon, after certain signal processing, the signal stored in the memory member is corrected in such a way that it tends to further reduce the resultant acoustic pressure. Specifically, the last-mentioned publication describes methods whereby the correction is calculated from a measured value synchronized with the disturbance source and is added to the contents of the memory member in a phase-correct manner in view of the acoustic delay of the system, whereby the magnitude of the correction can either be given predetermined values or be in proportion to the amplitude of the resultant acoustic pressure.

Also EP application No. 88112057.0 (Publ. No. 0 301 483) describes a controller for a power convertor for systems for non-interrupted power supply, active filters, etc. The controller comprises a memory member adapted to store a signal corresponding to the output signal of the controller during a period of a repetitive sequence. The signal stored in the memory member is corrected by adding the control error, with one cycle's time delay, to the contents of the memory.

The introduction of a memory member for storage of signal values in the controller makes it possible to achieve a good cancellation of a stationary periodic disturbance, also with an amplification in the feedback loop which is low for reasons of stability. However, a low amplification means that the contents of the memory member is corrected relatively slowly during non-steady states.

The major disadvantage in this case is that delay effects and other non-minimum phase effects as well as other types of system dynamics are not included and compensated. In general, the correction of the memory with the control error delayed one period will make the controller unstable as there are implicit or explicit delay effects of the systems and other dynamics as well. The total delays add up to more than one period and therefore, even if the controlled system is stable, the damping effect of disturbances with one period repetitive patterns is not very high.

SUMMARY OF THE INVENTION

The object of the invention is to provide a method for reducing, in a power network, disturbances such a harmonic currents or harmonic voltages, generated by a disturbance source included in or connected to the power network, and a device for carrying out the method. The power network may, for example, consist of a network for transmission of high-voltage direct current connected to an a.c. network by means of a converter. The method is to permit a total elimination of harmonics over a broad frequency spectrum by a dynamically stable active filtering as well as fast adaptation to non steady disturbances.

What characterizes the invention will be clear from the claims.

BRIEF DESCRIPTION OF THE DRAWINGS

The invention will be explained in greater detail, by means of embodiments, with reference to the accompanying drawings, wherein FIG. 1 schematically shows a power network comprising a disturbance source and an active filter.

DESCRIPTION OF THE PREFERRED EMBODIMENTS

Figure 1:
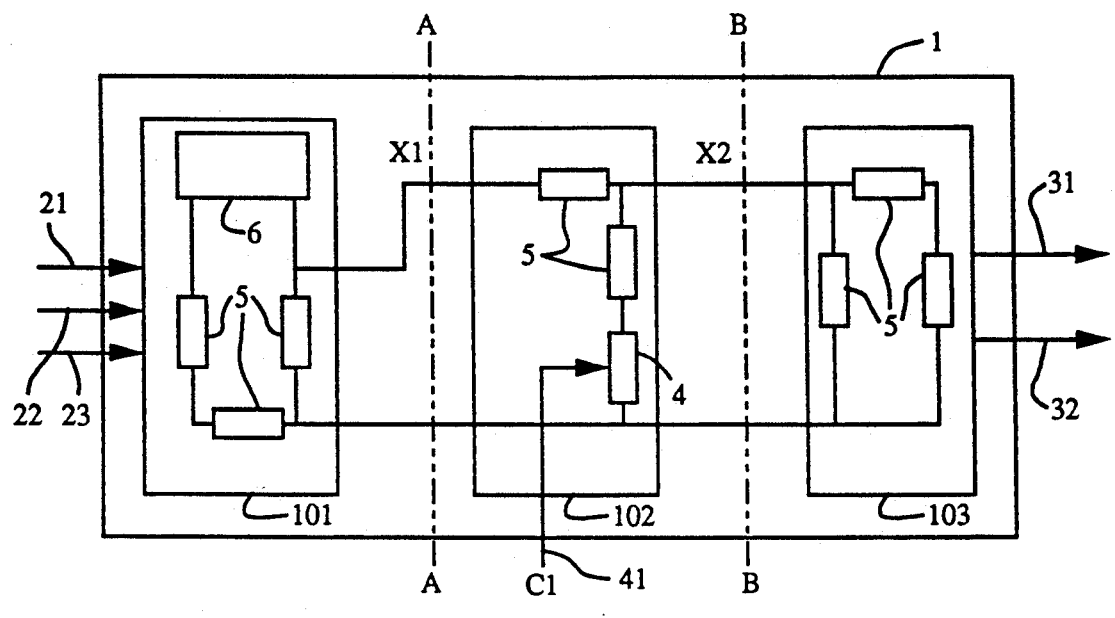

FIG. 1 shows an electric power network 1 with three input lines 21, 22, 23 and two output lines 31, 32. As schematically shown in the figure, the power network comprises a plurality of interconnected components 5 brought together into three interconnected component groups, a first 101, a second 102 and a third 103 component group. The second component group 102 comprises components which are at least approximately linear whereas the first and third component groups 101 and 103 may comprise non-linear components. In the power network, currents and voltages arise which contain components which are regarded as disturbances. The disturbances are generated by a disturbance source 6 present in the power network and/or connected thereto. The power network comprises an active filter 4 which is arranged in the second component group 102 and which, in dependence on a control signal C1 supplied via a control input 41, is adapted to influence at least some current or voltage occurring in the power network so that the components of the currents and/or the voltages on the output lines 31, 32, which are regarded as disturbances, are reduced or eliminated. The figure indicates a division of the power network by means of a first section A—A and a second section B—B. The section A—A is situated such that the output lines and the control input are located on one side of the section and the disturbance source and the input lines are located on the other side thereof. The second section B—B, which should not intersect the first section A—A, is situated such that it divides the power network between the control input and the output lines so that the at least approximate linear second component group 102 is situated between sections A—A and B—B.

One or several state variables, which are generally designated Y1i and which may consist of currents, voltages, pulse trains, etc. in the power network, are measured in the power network (this is not shown in FIG. 1 but is performed in a manner known per se). In the event that it should be or needs to be defined in the following that the first state variable Y1i is measured at the second section B—B, this variable, by definition, is given the designation second state variable Y2i.

Figure 2A:
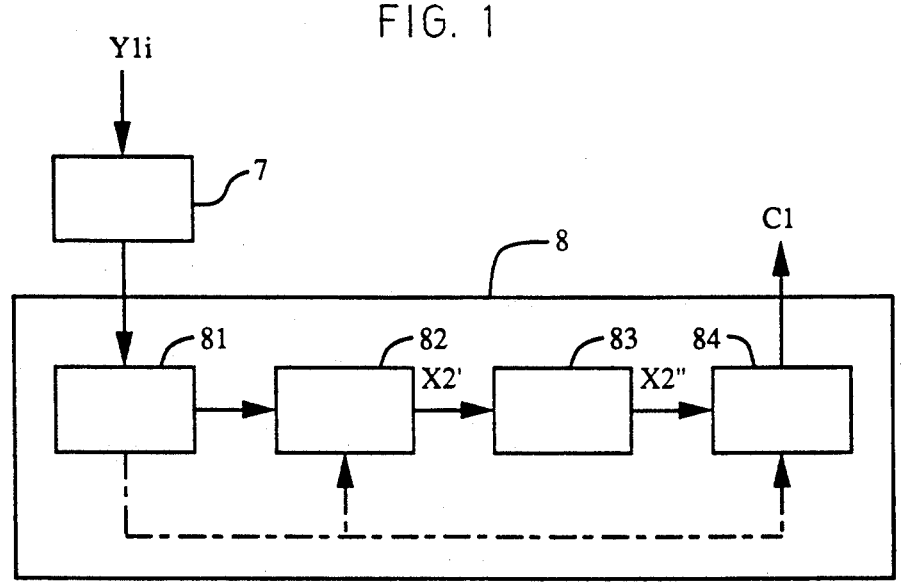
FIG. 2A shows in the form of a block diagram an embodiment of a control member according to the invention for the active filter according to FIG. 1, FIG. 2B schematically shows equivalent disturbance current and voltage generators as well as an equivalent internal impedance for the network according to FIG. 1, seen from the second section B—B, FIG. 2C schematically shows equivalent disturbance current and voltage generators as well as an equivalent internal impedance for the network according to FIG. 1, seen from the third section C—C.
Figure 2B:
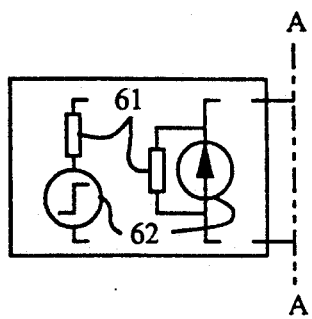

The above-mentioned measured values of state variables are supplied to a control member 8, the function of which is schematically illustrated in FIG. 2A. A measuring device 7 senses, in the manner described above, one or several first state variables in the power network, these state variables being indicated in FIG. 2A by the general designation Y1i. However, it is to be understood that this designation Y1i may refer to one or more state variables. The measured value Y1i is supplied to a first calculating member 81, adapted to calculate, based on the measured state variables and on a known model of the power network comprised in the first calculating member, an equivalent disturbance voltage or disturbance current generator 62 as well as an equivalent internal impedance 61 for the disturbance source, seen from the first section A—A, in a two-pole model, as illustrated in FIG. 2B. The disturbance voltage or disturbance current generator 62 is determined such that it generates, at least approximately, in the first section A—A, the same disturbance currents and/or disturbance voltages as the disturbance source. Alternatively, in the event that the first state variables Y1i are measured in the first section A—A, the first calculating member 81 may be adapted, based on measured values of at least two state variables Y1i in the first section A—A, for example current and voltage, and on a model of the power network, to directly calculate an equivalent disturbance voltage or disturbance current generator 62 as well as an equivalent internal impedance 61 for the disturbance source, seen from the first section A—A. Also in the event that only one current or one voltage is available for measurement in the first section A—A, an equivalent ideal disturbance current or disturbance voltage generator may be determined, in which case, however, a certain feedback effect arises between the influence on the network by the active filter and the disturbance source. In many cases, the impedance levels for the component groups included in the power network are such that, during the above-mentioned calculations, only the first component group 101 need be taken into consideration.

The equivalent disturbance voltage or disturbance current generator 62 with the associated equivalent impedance 61, calculated in the first calculating member 81, is then applied to a model comprised in a second calculating member 82 and representing the second and third component groups 102 and 103 for calculating the disturbance currents and/or disturbance voltages X2 occurring in the second section B—B and generated by the disturbance source, without any action by the active filter. In this case, the possibly non-linear third component group 103 may be replaced by an imaginary linear load or by an open circuit.

It is not always desirable to adapt the control member to reduce or eliminate, via the active filter, all the frequency components in the disturbance currents or disturbance voltages occurring in the second section B—B. The values X2' of the disturbance currents and/or disturbance voltages X2 occurring in the second section B—B, calculated in this manner, are therefore applied to a third calculating member 83 adapted to reduce or eliminate in the calculated values X2', by filtering, such components X2h as are not to be reduced or eliminated on the output lines 31, 32 of the power network. The components X2" of the calculated disturbance currents and/or disturbance voltages X2' then remaining are applied to a fourth calculating member 84 which is adapted, based on the inverted transfer function G1 between the control signal C1 and the disturbance currents and/or disturbance voltages X2 in the second section B—B, to determine an equivalent signal CE which is of such a nature that, applied to the control input 41, it produces at least approximately the same disturbance currents and/or disturbance voltages X2 in the second section B—B as those calculated in the third calculating member 83, and to generate a control signal C1 corresponding to the equivalent signal with reversed polarity, which control signal is supplied to the control input 41 of the power network. In the event that, during the calculation of the disturbance currents and/or disturbance voltages X2, the third component group 103 is replaced by an imaginary linear load or by an open circuit, also the equivalent signal CE is calculated with the corresponding model of the third component group.

Thus, in the method described, the components of the currents and/or voltages X2 occurring in the second section B—B and regarded as disturbances are reduced or eliminated by feeding forward a control signal to the active filter, whereby also the disturbances generated by the disturbance source and occurring on the output lines of the power network are reduced or eliminated.

It is to be understood that the input and output lines and control inputs shown in FIG. 1 are only shown as examples and that, in the general case, their number may deviate from the numbers shown. The parameters included in the second and fourth calculating members 82, 84 may be given variable values corresponding, for example, to varying impedance values for the components 5 comprised in the component groups. This is illustrated in FIG. 2A by a dashed line from the first calculating member 81 to the second and fourth calculating members.

The two-pole models shown in FIG. 2 consist in the general case, when more than two state variables are sensed, of multi-pole models. In the event that the control member is adapted to reduce or eliminate, via the active filter, all the frequency components in the disturbance currents or disturbance voltages occurring in the second section B—B, the third calculating member 83 may be omitted and the disturbance currents and/or disturbance voltages X2, calculated by the second calculating member 83 and occurring in the second section B—B without any action by the active filter and generated by the disturbance source, be supplied to the fourth calculating member 84.

Figure 3:
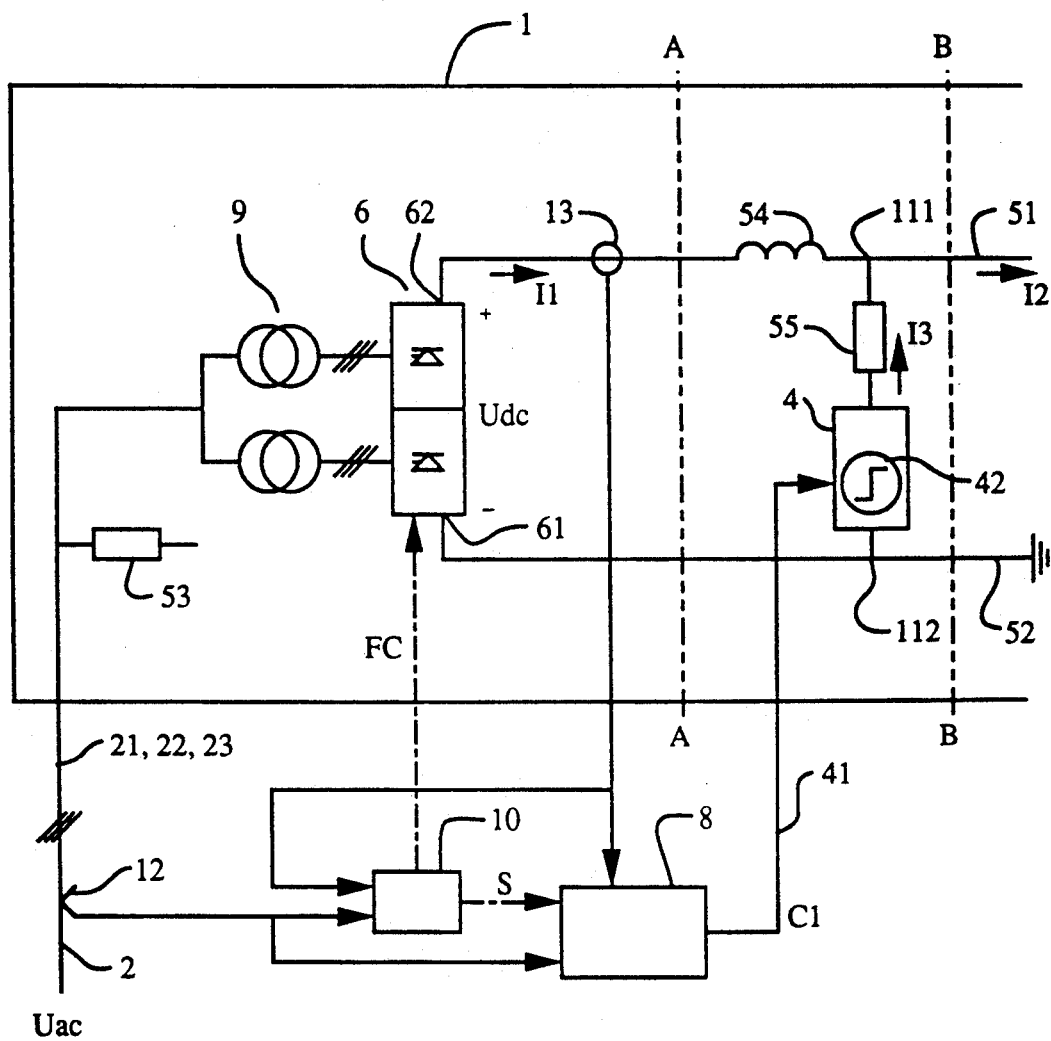
FIG. 3 shows in the form of a single-line diagram a pole of an HVDC station with an active filter and a control member according to the invention.

FIG. 3 shows a converter 6 in a 12-pulse connection included in an HVDC plant, which converter is connected in a known manner by way of transformers 9 to a three-phase a.c. network 2 (only indicated in the figure). A harmonic filter 53 is connected to the a.c. network, and this filter also comprises capacitor banks for generating reactive power. The neutral terminal 61 of the converter is connected to an electrode line 52 and its pole terminal 62 is connected to one of the terminals of a smoothing reactor 54, the other terminal of which is connected to a pole line 51. A control unit 10, arranged in a manner known per se, supplies the converter with pulses FC, which control the ignition of the valves included in the converter and which also generate synchronizing pulses S timely related to the pulses FC. The phase voltages of the alternating voltage network are designated Uac1, Uac2, Uac3 and the voltage across the converter is designated Udc. From the pole terminal of the converter flows the direct current I1 and out on the pole line flows the pole line current I2. A passive filter 55 is connected with one of its terminals to the pole line 51 at a first connection point 111, located, as viewed from the converter, on the pole line beyond the smoothing reactor, and with its other terminal it is connected to one of the terminals of an active filter 4 comprising a controllable voltage generator 42, the other terminal of the filter being connected to a second connection point 112 on the electrode line. Through the passive and active filters thus connected in series, the filter current I3 flows. The passive filter may be designed tuned and/or as a high pass filter. The voltages Uac of the three phases of the alternating voltage network are measured in a manner known per se by means of a voltage measuring device 12, which comprises voltage transformers and analog-to-digital converters, and the direct current I1 is measured by means of a first current measuring device 13. The power network 1 described with reference to FIG. 1 is represented in FIG. 3 by the a.c. network 2, the harmonic filter 53, the transformers 9, the converter 6, the smoothing reactor 54, the passive filter 55, the active filter 4, the pole line 51, the electrode line 52, and a load (not shown in the figure) connected to the pole line 51. The sections A—A and B—B described with reference to FIG. 1 have been located in FIG. 3 such that the first section A—A intersects the connection between the pole terminals of the converter and the smoothing reactor 54 and the electrode line 52 between the converter and the second connection point 112, and the second section B—B such that it intersects the pole line 51 and the electrode line 52, as viewed from the converter beyond the passive filter 55 and the active filter 4 but before the load (not shown) connected to the pole line. The sensed first state variable Y1i consists of the phase voltages Uac1, Uac2, Uac3 of the alternating voltage network, the direct current I1 of the converter and the synchronizing pulses S generated by the control unit 10.

Figure 4:
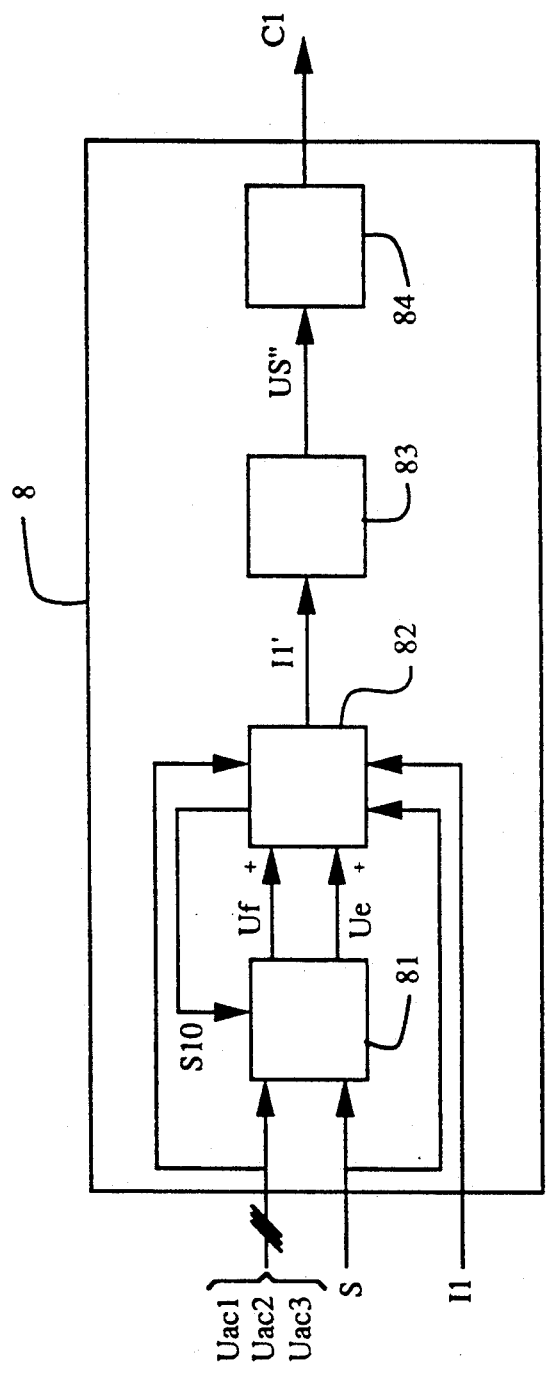
FIG. 4 shows in the form of a block diagram an embodiment of a control member according to the invention in an HVDC station according to FIG. 3, FIG. 5 schematically shows how an equivalent disturbance voltage is formed from voltages supplied to the control member according to FIG. 4.

A control member 8, the design of which will be explained in greater detail with reference to FIG. 4, generates, in dependence on the phase voltages Uac1, Uac2, Uac3 of the alternating voltage network, the direct current I1 and the synchronizing pulses S, a control signal C1 which is supplied to the voltage generator 42 via the control input 41.

The first calculating member 81 is supplied with sampled values of the three phase voltages Uac1, Uac2, Uac3 of the alternating voltage and with the synchronizing pulses S synchronized to the firing pulses to the thyristors of the converter. The first calculating member is adapted, in dependence on the synchronizing pulses, to select, in a manner known per se, from a table the phase voltage or voltages of the alternating voltage which, in dependence on the commutating state of the converter, is or are connected to the direct voltage side of the converter, and to form therefrom a first model voltage Uf in such a way that this voltage during a commutation sequence is formed as the difference between the phase voltages for the phases which are under commutation and between the commutation sequences as the phase voltage for the phase which is connected to the direct voltage side of the converter. Further, the first calculating member is adapted to form a second model voltage Ue which corresponds to the overvoltage which at the end of the commutation sequence is generated because of the recovery charge of the decommutated thyristor. The second model voltage Ue has a saw-tooth shape and its magnitude is determined in dependence on the voltage jump when the commutation has terminated and is preferably calibrated on the installed plant for best accuracy.

In a model arranged in the second calculating member 82 and representing the impedances included in the commutating circuit, a commutating current Ik is calculated in dependence on the first model voltage Uf for calculating the commutating sequence. As starting value for the current Ik in the model, a value of the direct current I1, measured by the first current measuring device 13 and supplied to the second calculating member 82, is set, and when the current Ik calculated in the model has dropped to the value zero, the commutation has been terminated. Further, the second calculating member 82 is adapted to comprise a model of the converter for calculating the direct current I1 without any action by the active filter 4. This latter model is supplied both to the first model voltage Uf and, when the commutation according to the previously described calculation is terminated, to the second model voltage Ue. The time of terminated commutation is marked in FIG. 4 by a signal S10 from the second to the first calculating member.

Now, if the load, connected to the pole line and not shown in the figure, is replaced by an open circuit at the second section B—B, the current I1 representing the calculated value I1' will flow through the series-connected passive and active filters 55 and 4. If the filters are assumed to have the total impedance ZF, a voltage $US = ZF*I1$ will then arise across the second section B—B, and it is realized that in this case the voltage US contains the same disturbance frequencies as the current I1. The filtering which is performed in the third calculating member 83 can therefore also be performed on a calculated voltage US'=ZF*I1'.

The third calculating member 83 is adapted to eliminate, from the value I1' of the direct current calculated in the second calculating member, the d.c. component and, to avoid reduction of these tones via the control member with an ensuing high load on the active filter, components I1h of the fundamental tone of the a.c. network as well as the second and third tones of the a.c. network. In this case, the third calculating member comprises a known value of the total filter impedance ZF and the above-mentioned filtering is carried out on a calculated voltage US'=ZF*I1'. From the third calculating member 83 there is thus obtained a calculated value US" which corresponds to a calculated current I1" with the d.c. component and the above-mentioned harmonics I1h eliminated or at least reduced. It is realized that if the controllable voltage generator 42 comprised in the active filter 4 is brought to generate a filter voltage UF with reversed polarity to the voltage US", the disturbances corresponding to the calculated value I1" will be eliminated in the second section B—B, that is, on the pole line.

The control signal C1 is supplied to the voltage generator 42 which in the circuit, formed by the active filter 4 connected in series with the passive filter 55, between the pole line 51 and the electrode line 52, thus injects a filter voltage UF with reversed polarity to the voltage which those components of the direct current I1, which correspond to those included in the calculated value I1", generate in the circuit mentioned. The voltage generator thereby generates a filter current I3, which at the connection point 111 between the pole line 51 and the above-mentioned series connected circuit is added to the direct current I1 such that, for the processed interference frequencies, the sum at this connection point becomes zero or at least near zero. In this way, the above-mentioned interference frequencies in the pole line current I2 will also be zero or at least near zero.

Figure 5:
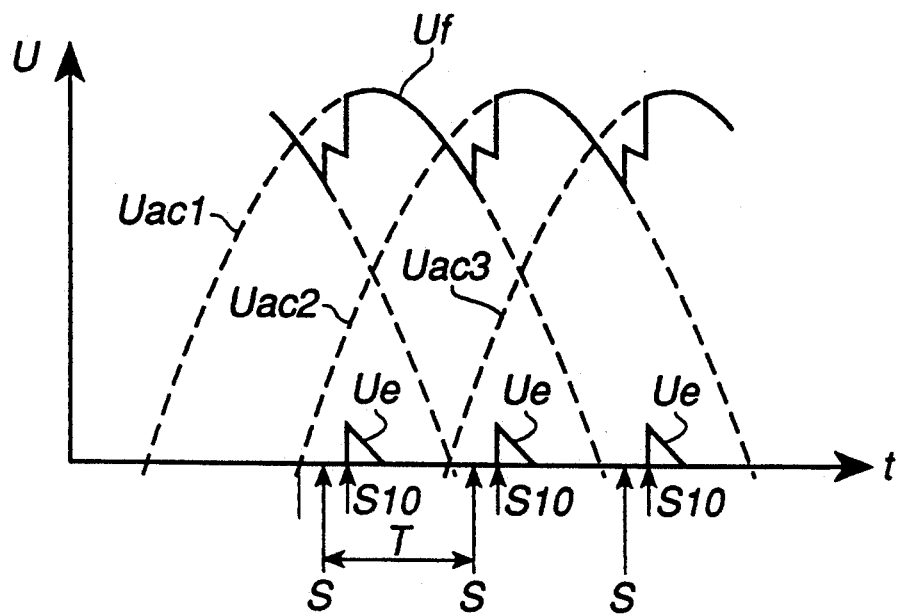

FIG. 5 shows on the horizontal axis the time t and on the vertical axis schematically how the first model voltage Uf is formed from the phase voltages Uac1, Uac2 and Uac3 of the alternating voltage network. Further, the vertical axis shows the variation of the second model voltage Ue in time related to the first model voltage Uf. The horizontal axis also shows a sequence of synchronizing pulses S, which are simultaneous with the firing pulses which initiate the commutating sequences as well as the signal S10 representing the times for terminated commutation. The disturbance contents of the model voltages will be substantially cyclic with the cycle time T. In order to render the figure clearer, the conditions in connection with a 6-pulse connection are shown. The corresponding voltages in a 12-pulse connection are formed as the sum of the voltages of two 6-pulse groups.

Figure 6:
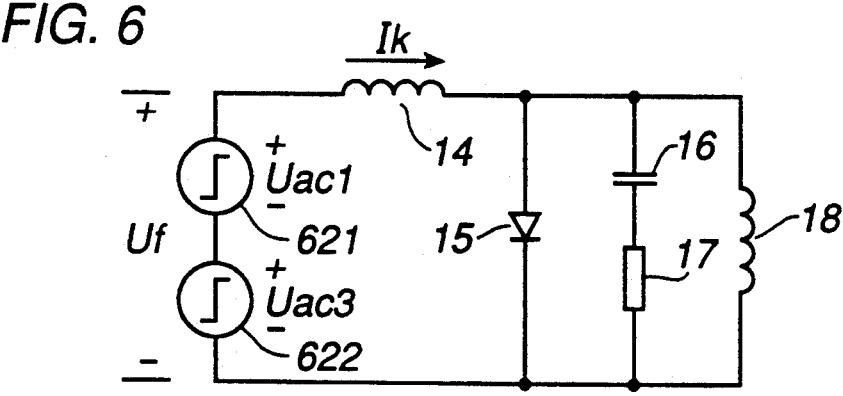
FIG. 6 shows a model for calculating the current commutation process in the control member according to FIG. 4.

FIG. 6 shows the model, comprised in the second calculating member 82, for calculating the commutating current Ik during a commutating sequence determined by the phase voltages Uac1 and Uac3. These are represented in the model by two voltage generators 621, 622, the sum voltage Uf of which at the time shown consists of the difference between the phase voltages Uac1 and Uac3, whereas the impedances included in the short-circuited commutating circuit are represented by the reactor 14. The diode 15 with the capacitor 16 and the resistor 17 represent the thyristors included in the converter with overvoltage protection in the form of RC circuits whereas the reactor 18 represents the smoothing reactor 54.

Figure 7:
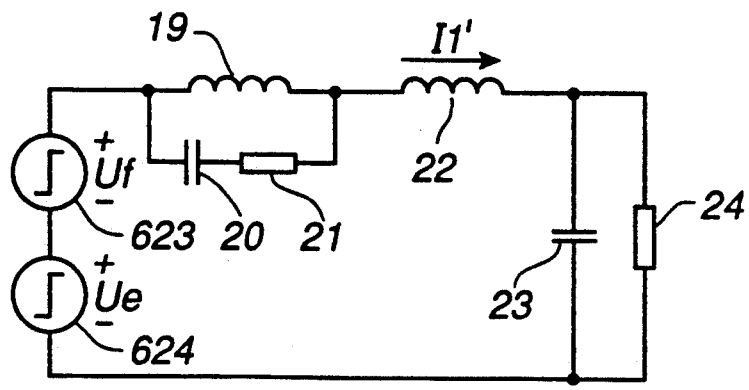
FIG. 7 shows a model for calculating the disturbance current on the d.c. line in the control member according to FIG. 4.

FIG. 7 shows the model, also comprised in the second calculating member 82, for calculating the current I1' representing the direct current I1. The first and second model voltages Uf and Ue, respectively, are represented by the voltage generators 623, 624. The reactor 19 represents the inductance of the connected phases, the capacitor 20 and the resistor 21 represent the overvoltage protection of the thyristors in the form of RC circuit whereas the reactor 22 represents the smoothing reactor 54 through which the direct current I1 flows. The capacitor 23 and the resistor 24 form a smoothing circuit across which a measure of the direct voltage component of the voltage Udc of the converter is obtained.

The models shown in FIGS. 6 and 7 may advantageously be implemented in a microprocessor for carrying out the calculations mentioned. In the course of the calculation, the shown impedance elements are given varying values corresponding to the prevailing configurations and current levels in the circuits represented by the models.

Figure 12:
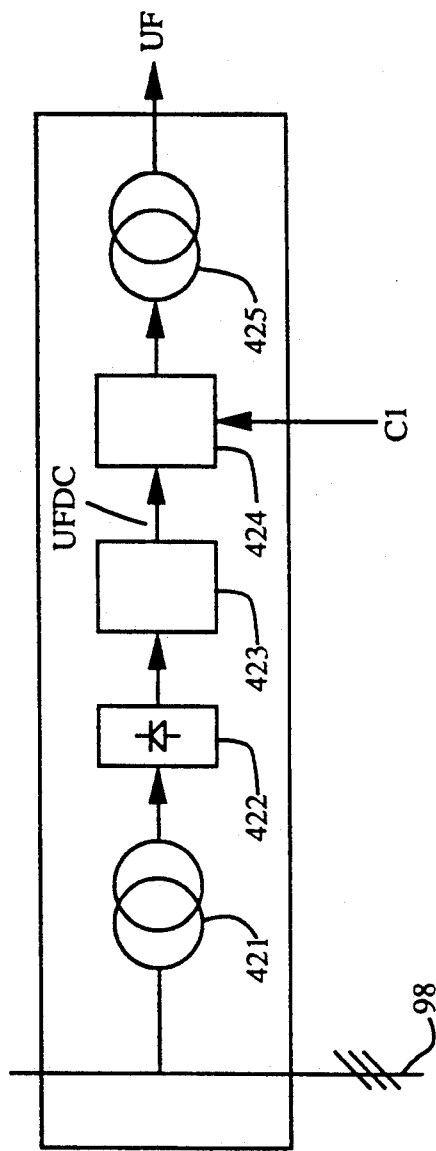
FIG. 12 shows in the form of a block diagram an embodiment of a voltage generator comprised within an active filter.

An embodiment of the voltage generator 42 is shown in block diagram form in FIG. 12. A supply transformer 421 connected to a three-phase a.c. network 98 with the main voltage 380 V supplies, over a diode rectifier 422, a supply filter 423 comprising a capacitor element, on the output side of the supply filter a direct voltage UFDC of 300 V being available. A number of parallel-connected MOSFET amplifiers, arranged in a manner known per se, comprise a power amplifier 424 adapted to generate, in dependence on the control signal C1, by pulse-width modulation, in a manner known per se, over the primary winding of a single-phase coupling transformer 425, from the direct voltage UFDC, a voltage corresponding to the control signal C1. Over the secondary winding of the coupling transformer 425, which secondary winding is connected between the passive filter 55 and the electrode line 52, the filter voltage UF is obtained. The direct voltage Udc of the converter 6 is nominally 285 kV and the frequency of the a.c. network 2 is 50 Hz. The passive filter 55 is tuned to 600 Hz and 1200 Hz and the power amplifier 424 is dimensioned to yield about 275 A rms at about 260 V. By means of an internal current feedback, the power amplifier can also be adapted to generate a current I3 corresponding to the control signal in the circuit, formed by the active filter 4 connected in series with the passive filter 55, between the pole line 51 and the electrode line 52. Two antiparallel-connected thyristors (not shown in the drawing), connected across the secondary winding of the coupling transformer 425, are adapted, in dependence on an overvoltage and/or overcurrent in the active filter, sensed in a manner known per se, to bypass the secondary winding of the coupling transformer 425.

Figure 8:
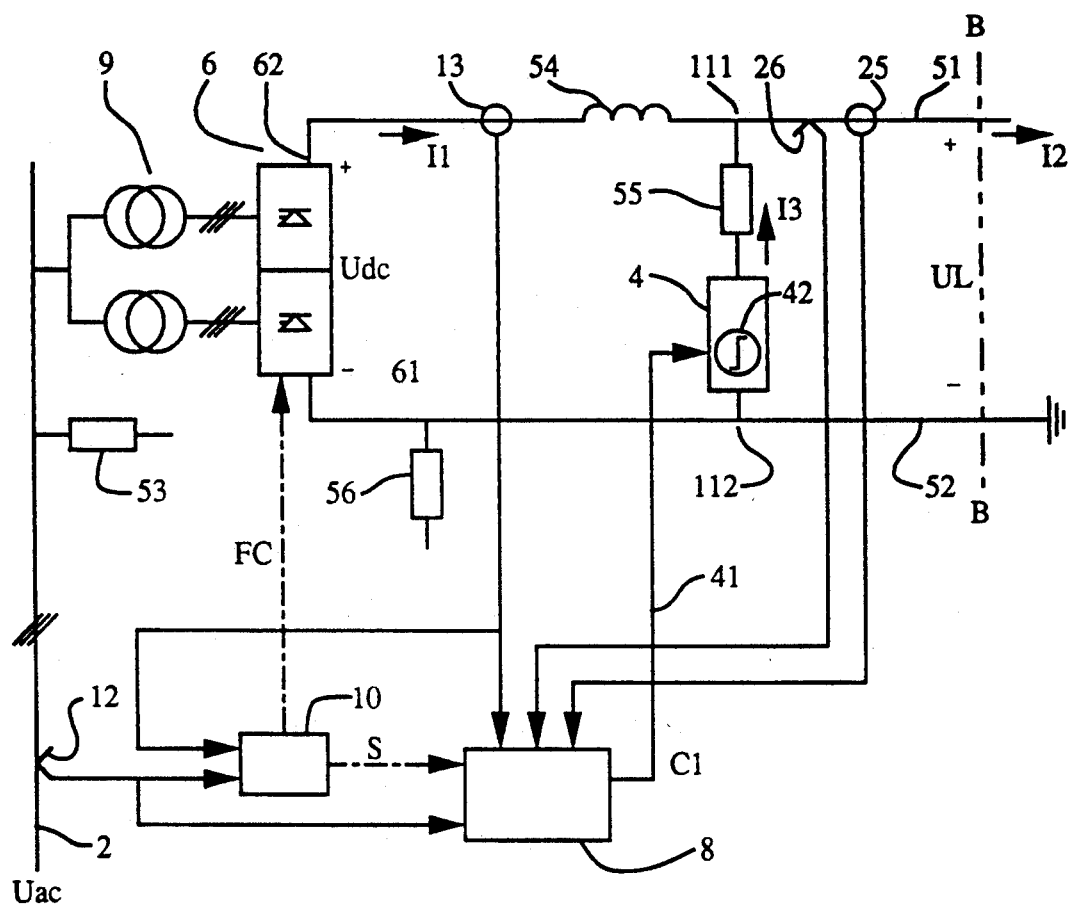
FIG. 8 shows in the form of a single-line diagram a pole of an HVDC station with an active filter and a control member according to a further embodiment of the invention.

FIG. 8 shows an HVDC plant similar to that shown in FIG. 3 but in this case the current flowing through the pole line 51 is also sensed, at the pole line 51, by means of a second current measuring device 25. The second current measuring device 25 is based on current measurement by means of a Rogowski coil and its output signal thus comprises only the a.c. components of the current flowing through the pole line. These a.c. components constitute a current which in the following will be designated I2. The sensed value of the current I2 is supplied to the control member 8 for a feedback control of the active filter. The control member thereby has an embodiment according to FIG. 9 and comprises, in addition to the calculating members 81, 82, 83 and 84 described above, a controller 85 of repetitive type, provided for the purpose, the output signal C1" of which in the fourth calculating member 84, after any necessary signal adaptation, is summed to the control signal generated in dependence on the equivalent signal CE. The fourth calculating member 84 is thus adapted to comprise conventional signal adaptation members to achieve the above-mentioned summation, the result of which is supplied to the control input 41.

Figure 10:
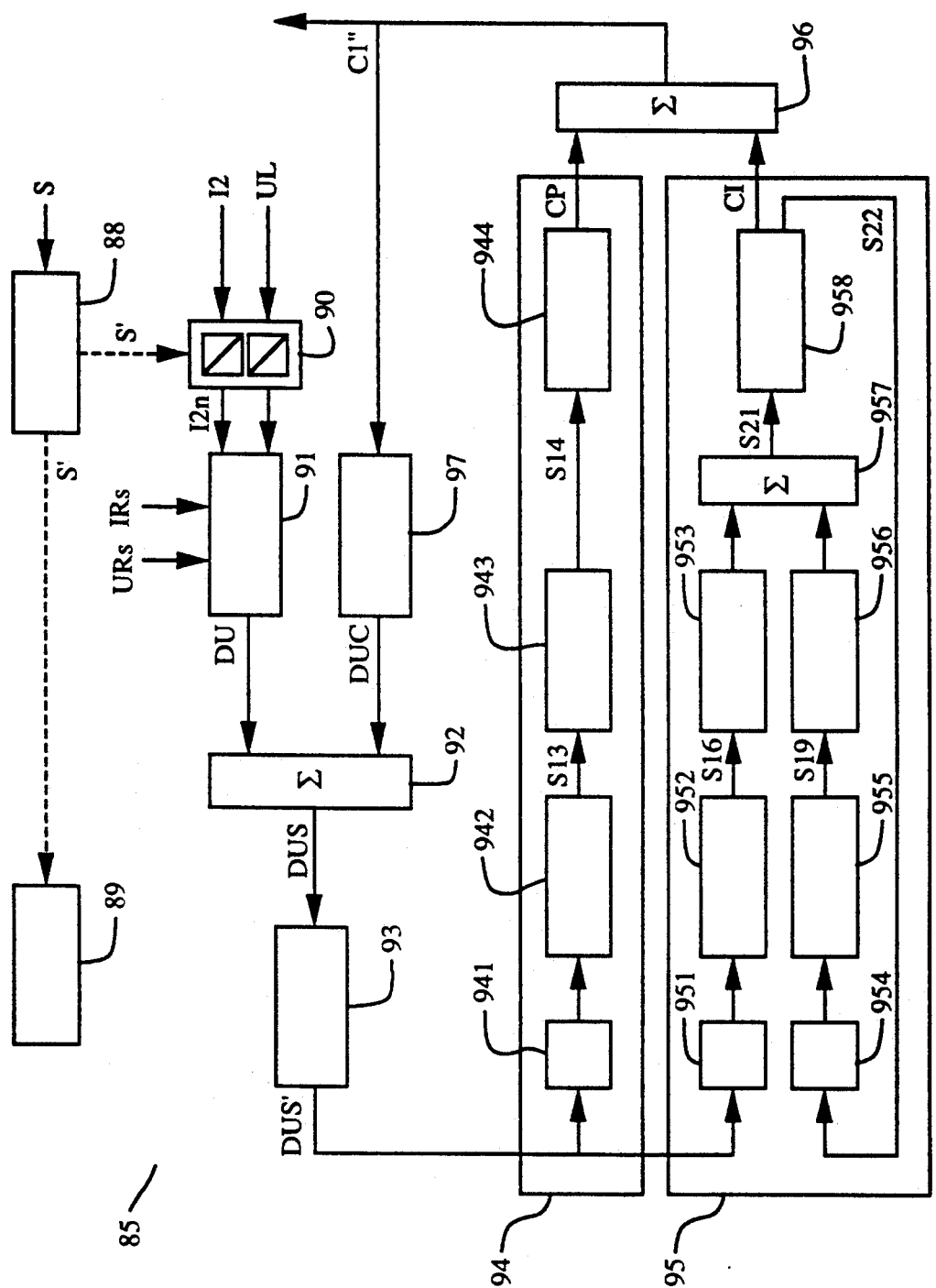
FIG. 10 shows in the form of a block diagram an embodiment of a controller according to the invention, arranged in a control member.

An embodiment of the controller 85, implemented in a computer (not shown in the figure), is shown in block diagram form in FIG. 10. The synchronization signal S is supplied to a synchronization member 88 adapted to sense the time difference T between two consecutive synchronizing pulses S and to form, from the sequence of these time differences T, by low pass filtering an equalized period time value T' corresponding to the period of the repetitiveness of the disturbance source, in this case the converter. Further, the synchronization member is adapted to divide the period time value T' thus equalized by a predetermined pulse number N, which is the number of samples during the equalized period T' that the repetitive controller is working with, and to generate a sequence of control pulses S' of a frequency such that N control pulses are generated during the equalized period time T'. The control pulses S' are supplied to a control member 89 adapted to control the frequency of the calculations of the above-mentioned computer. In the following it is to be understood that in this embodiment all signal processing in the controller 85 takes place sampled and controlled by the control pulses S'. A signal-converting member 90 is adapted to receive a value of the pole line current I2 and, at each one of the control pulses S', to supply a reference member 91 with a sampled value I2n of the a.c. components of the pole line current. The reference member 91 is also supplied with a reference value IRs for the a.c. components of the pole line current and is adapted to form a control deviation DU as the difference between the reference value IRs and the sampled value I2n of the a.c. components of the pole line current. The reference value IRs is normally given the value zero. The control deviation DU is supplied to a first summator 92 and is summed therein with a correction DUC, which will be further described below. The output signal DUS of the summator 92 is supplied to a first filtering device 93, the transfer function F1 of which simulates the inverse of the transfer function F1' from the signal C1" to the control deviation DU, which results in a linearization of the feedback system, which comprises the controller 85 and a transfer function between the output signal C1" of the controller and the value I2 of the a.c. components of the pole line current. By linearization in this connection is to be understood that the amplitude of the transfer function for the mentioned feedback system is substantially constant in a frequency range in which the controller 85 is adapted to work, and that the delay in the transfer function for the mentioned feedback system is such that the control deviation DU will generate a correction to the output signal of the controller delayed by the equalized period time T' reduced by the time between two consecutive control pulses S'. The reduction by the time between two consecutive control pulses S' is due to the fact that in this case the system is assumed to work in sampled mode and takes account of the delay resulting therefrom. The output signal DUS' from the first filter device 93 is supplied to a proportional controller 94 and an integrating controller 95.

The proportional controller comprises a first setting member 941 for setting the amplification of the controller, a first memory member 942 comprising a number of memory cells (not shown in the figure), the contents of which, which may be regarded as a stored first sequence SC11 of values C11n, for forming an output signal S13 from the first memory member, are sensed cyclically at the pace set by the control pulses S', a second filter device 943, the transfer function of which is adapted to bring about a low-pass filtering without phase shift, as well as a third filter device 944 adapted to reduce or eliminate certain frequency components in the output signal of the controller. All the members mentioned are cascade-connected in the order in which they have been enumerated. With the exception that the second filter device 943 in the embodiment shown has to be cascade-connected to the first memory member 942, however, the order between the members and devices mentioned is arbitrary.

The integrating controller comprises a second setting member 951 for setting the amplification of the controller, a second memory member 952 comprising a number of memory cells (not shown in the figure), the contents of which, which may be regarded as a stored sequence SC12 of values C12n, for forming an output signal S16 from the second memory member, are sensed cyclically at the pace set by the control pulses S', a third filter 953, the transfer function of which is adapted to bring about a low-pass filtering without phase shift, a third setting member 954 for setting the integrator effect of the controller, a third memory member 955 comprising a number of memory cells (not shown in the figure), the contents of which, which may be regarded as a third stored sequence SC13 of values C13n, for forming an output signal S19 from the third memory member, are sensed cyclically at the pace set by the control pulses S', a fourth filter device 956, the transfer function of which is adapted to bring about a low-pass filtering without phase shift, a second summator 957 for summing the output signals from the third and fourth filter devices 953 and 956, as well as a fifth filter device 958 adapted to reduce or eliminate certain frequency components in the output signal of the controller. The second setting member 951, the second memory member 952 and the third filter device 953, and the third setting member 954, the third memory member 955 and the fourth filter device 956, respectively, are cascade-connected in the order in which they have been enumerated. However, in the embodiment shown, the second setting member 951 and the third setting member 954 may alternatively be connected respectively to the outputs of the third filter device 953 and the fourth filter device 956.

All the memory members 942, 952, 955 are adapted such that the sequences SC11, SC12, SC13 of values C11n, C12n, C13n stored therein are updated with the signals supplied thereto, cyclically at the pace set by the control pulses S'. If the first memory member 942 contains q1 memory cells and an amplification P is set in the first setting member, then for the output signal S13(t) of the first memory member at time t, where the time t is calculated in numbers of control pulses S', $S13(t) = P * DUS'(t - q1)$. In the same way, if the second memory member 952 contains q2 memory cells and an amplification PI is set in the second setting member, for the output signal S16(t) of the second memory member at time t, $S16(t)=PI*DUS'(t-q2)$, and if the third memory member 955 contains q3 memory cells and an amplification D is set in the third setting member, for the output signal S19(t) of the third memory member at time t, $S19(t)=D*S22(t-q3)$, where S22 is the input signal supplied to the third memory member. The output signals CP and CI, respectively, from the second filter device 943 and the fifth filter device 958 constitute the output signals of the proportional controller and the integrating controller, respectively, which output signals are summed in a third summator 96 to the output signal C1" of the controller 85 which consists of a fourth sequence SC14 of values C14n.

The output signal C1" of the controller 85 is also supplied to a level control member 97 adapted to form the above-mentioned correction DUC, which in the first summator 92 is summed to the control deviation DU. In the event that the active filter 4 is only a.c.-connected to the power network 1, a constant output signal C1" from the controller 85 does not achieve any corresponding change of the fed back actual value of—in this case—the a.c. components of the pole line current I2. If, for example because of a calibrating error, the control deviation DU contains a constant value, the output signal C1" of the controller, because of its integrator effect, will grow continuously. To counteract this growth of the output signal C1", the level control member 97 is adapted to form, during the period T', the accumulated sum of the output signal C1" of the controller and to generate at the end of each period, in dependence on this sum, the correction DUC.

Figure 11A:
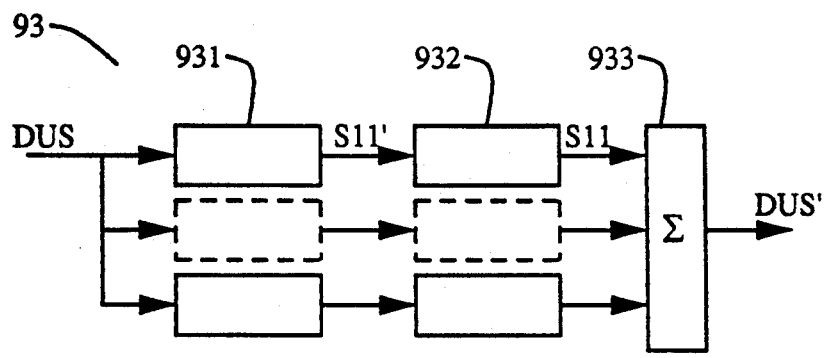
FIG. 11A shows in the form of a block diagram an embodiment of a compensating filter in a controller according to FIG. 10.

FIG. 11A shows in the form of a block diagram an embodiment of the first filter device 93. The filter device is composed of an optional number of parallel branches, each one comprising, in cascade connection, a compensating filter 931 and a delay filter 932. All the branches are supplied with the output signal DUS from the first summator 92 and the output signals S11 from the respective branch are summed in a fourth summator 933, the output signal DUS' of which is supplied to the proportional controller 94 and the integrating controller 95.

The compensating filters 931 are arranged in a manner known per se, each one with a transfer function of the type $S11(t) = \Sigma A_i * S11(t-i) + \Sigma B_i * DUS(t-i+1)$, where S11(t) and DUS(t) are the respective signal values at the time t.

Figure 11B:
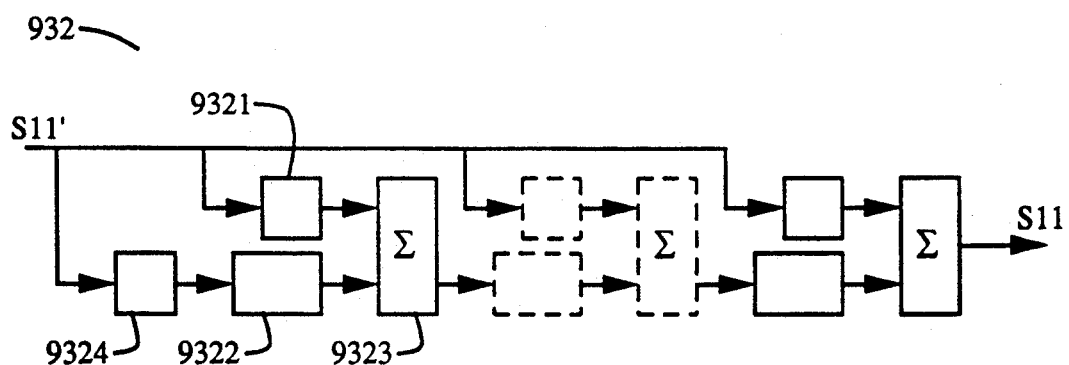
FIG. 11B shows in the form of a block diagram an embodiment of a delay-compensating circuit in a controller according to FIG. 10.

An embodiment of the delay filters 932 is shown in FIG. 11B. The delay filter comprises k cascade-connected groups, where k is an optional number. Each group consists of a first coefficient member 9321, adapted to multiply the supplied signal by a set coefficient, a delay member 9322 with a delay corresponding to the time between two control pulses S' as well as a summator 9323. The output signal S11' from the compensating filters 931 is supplied to all of the first coefficient members 9321 whereas each one of the summators 9323 is supplied with the output signals from the respective first coefficient members 9321 and delay members 9322 within the group. The output signal from the respective summator is supplied to the delay member in the immediately succeeding group in the cascade connection, whereby the last summator forms the above-mentioned signal S11. In addition, the delay member located first in the cascade connection is supplied with the output signal S11 from the compensating filters 931 via a second coefficient member 9324. All the coefficient members have coefficient values capable of being influenced, and if, for example, all of the first coefficient members are given the coefficient value zero whereas the coefficient value for the second coefficient member is different from zero, a pure time delay corresponding to k time differences between the control pulses S' is obtained. In the general case the power network exhibits time delays which may also be frequency-dependent and, especially if it comprises long lines, also time delays of a non-minimum phase character. By a suitable choice of coefficient values it is possible, with the shown embodiment of the delay filter, to adapt the filter to the properties of the power network by ensuring that the delay effect in the power network together with the total delay of the controller 85 corresponds to the equalized period time value T' representing the period for the repetitiveness of the disturbance source. Here, the principle is that the first filter device 93, by choosing the number k of the cascade-connected groups arranged in the delay filters 932, is adapted to enable a total time delay at least corresponding to the delay expected in the power network and that the total delay of the controller 85 is adapted to the equalized period time value T' representing the period for the repetitiveness of the disturbance source.

For setting coefficient values in the delay filters and the coefficients $A_i$ and $B_i$ in the compensating filters, it is advantageous to supply the active filter via the control input 41 with a noise signal C1NN or a harmonic signal C1NH, comprising a spectrum of sinusoidal signals, and by means of a frequency analyzer, as a function of the frequency, analyze amplitude and phase shift of the transfer function F1' from the signal C1" to the control deviation DU. Thereafter, with the aid of standard filter elements, a filter with the same properties as the transfer function F1' may be synthetized and inverted to a transfer function F1. The setting of the first filter device 93 may thereafter be performed by direct comparison with the transfer function F1.

Figure 11C:
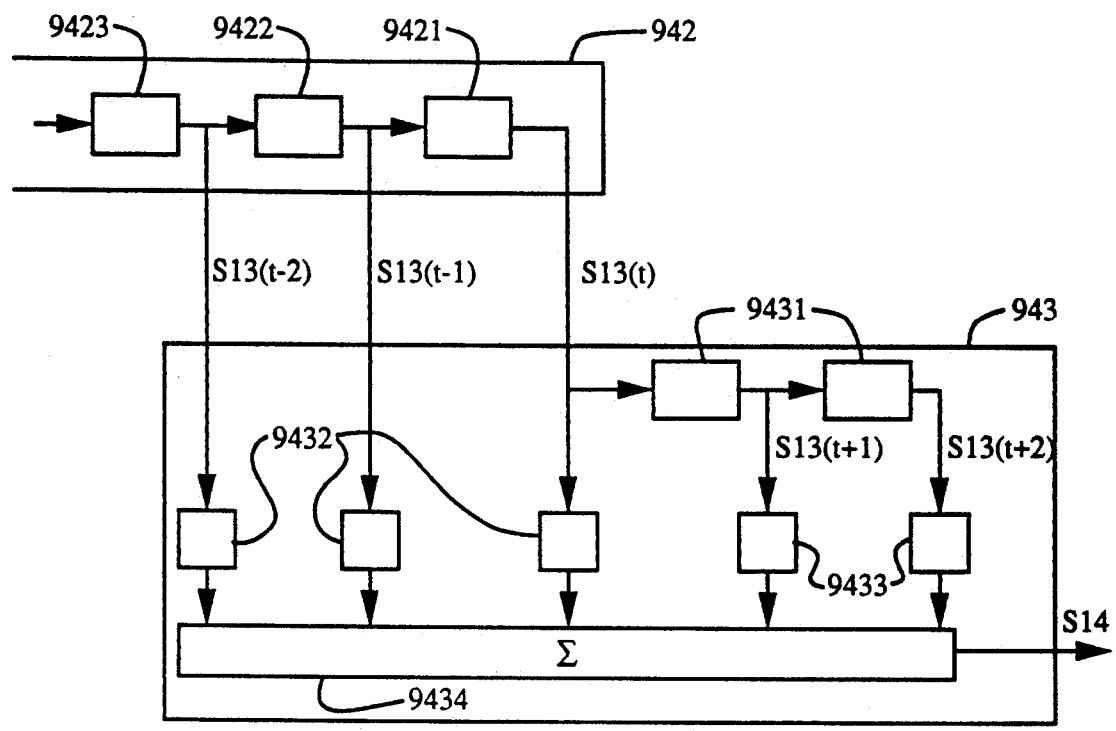
FIG. 11C shows in the form of a block diagram an embodiment of an attenuation circuit in a controller according to FIG. 10.

FIG. 11C shows in the form of a block diagram an embodiment of the second filter device 943, the transfer function of which is adapted to bring about a low-pass filtering without phase shift, which is essential with regard to the stability of the feedback control. Schematically shown as a number of cascade connected delay elements 9421, 9422, 9423, each one with a delay corresponding to the time between two control pulses S', the figure shows the first sequence SC11 of values C11n, stored in the first memory member 942, which are sensed cyclically at the pace set by the control pulses S' to form the output signal S13 of this memory member. The second filter device 943 is adapted to sense, at time t, both the value C11n1 in the sequence SC11 which corresponds to the output signal S13(t) and those values C11n2, C11n3 in the sequence SC11 which correspond to the output signals S13(t−1) and S13(t−2), respectively. The second filter device 943 comprises two cascade-connected delay elements 9431, 9432, each one with a delay corresponding to the time between two control pulses S', whereby the delay element located first in the cascade is supplied with the output signal S13(t) and at the outputs of which the output signals S13(t+1) and S13(t+2), respectively, are obtained, a first group of settable coefficient members 9432 adapted to be supplied with the output signals S13(t), S13(t−1) and S13(t−2), respectively, of the first memory member, a second group of settable coefficient members 9433 adapted to be supplied with the signals S13(t+1) and S13(t+2), respectively, formed at the outputs of the delay elements 9431, 9432, as well as a summator 9434 adapted to sum up the output signals from the first and second groups of coefficient members and to form at its output a signal S14. If the coefficient for the signal S13(t) is designated B0, the coefficients for the signals S13(t−1) and S13(t+1) are designated B1 and the coefficients for the signals S13(t−2), and S13(t+2) are designated B2, the signal S14(t) will be equal to B0 * S13(t)+B1 * (S13(t−1)+S13(t+1))+B2 * (S13(t−2)+S13(t+2)). If B1 is less than B0 and B2 less than B1, it is realized that, by the symmetrical weighing together of values C11n in the sequence SC11, an amplitude attenuation without any phase shift of the high-frequency contents in the output signal S13(t) is obtained in that values in this output signal with an equal time delay and time advance relative to the time t are weighed together with the same coefficient values, which monotonously decrease with increasing time delay and time advance, respectively. The second filter device 943 can be generally adapted to sense additionally delayed values of the output signal S13, whereby it is also adapted to comprise a corresponding number of further delay elements and coefficient members in addition to those shown in the figure, that is, 9431, 9432 and 9432, 9433, respectively. If the number of delay elements in the second filter device are designated p, the output signal S14 of the filter device can then be generally described as S14(t)=B0 * S13(t)+Σ(Bp * (S13(t−p)+S13(t+p)), where Bp is the coefficient value for the signals S13(t−p) and S13(t+p), respectively. To obtain the desired filtering function involving low-pass filtering with the amplification factor one, then for the sum BS=B0+ΣBp, the condition BS=1 shall be fulfilled and the values of the coefficients Bp decrease monotonously with an increasing value of the number p.

The third filter device 953 and the fourth filter device 956 arranged in the integrating controller 95 are adapted to process the respective output signals S16 and S19 from the second and third memory members 952 and 956 in a manner corresponding to that described for the second filter device 943.

By arranging the second filter device unsymmetrically with regard to selected values of the coefficients of the coefficient members and with regard to the number of sensed values in the signal S13 and the number of delay elements arranged in the second filter device, a general filter function, for example a resonance filter, can be obtained. By selecting the coefficient values Bp so that they do not decrease monotonously with an increasing value of the number p, filter functions involving damping of certain frequencies may be achieved. The second filter device can also be used to bring about an amplification adjustment if the sum BS is chosen to be a number different from one.

Figure 11D:
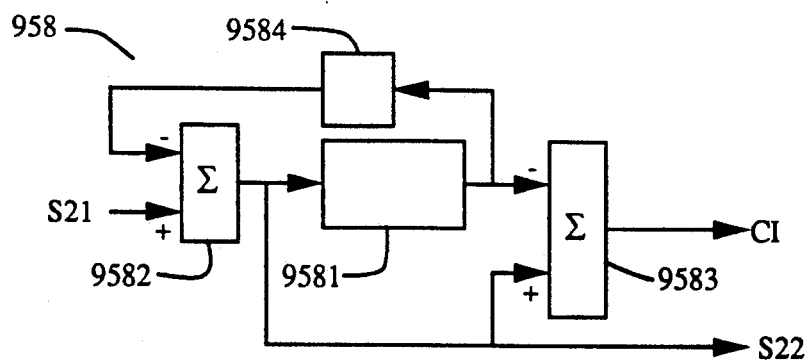
FIG. 11D shows in the form of a block diagram an embodiment of a filter circuit in a controller according to FIG. 10.

Since it is not always necessary or desirable to cancel out low-frequency disturbances with the controller 85, the controller comprises, as described above, a third filter device 944 arranged in the proportional controller and a fifth filter device 958 arranged in the integrating controller, which filter devices are adapted to reduce or eliminate, in the output signal of the controller, certain frequency components of a lower frequency. An embodiment of such a fifth filter device 958 is shown in the form of a block diagram in FIG. 11D. A pass filter 9581 arranged in a manner known per se comprises a number of parallel-connected branches, each one tuned to a frequency which should be eliminated from the output signal CI of the integrating controller. The output signal S21 from the second summator 957 is supplied to a summator 9582, the output signal S22 of which is supplied to the pass filter as well as to a summator 9583. The output signal from the pass filter is supplied to the summator 9583 and is fed back via a fourth coefficient member 9584 to a sign changing input on the summator 9582. The output signal from the summator 9583 constitutes the output signal CI of the integrating controller 95. The amplitude amplification in the pass filter is adjusted to the value one and the coefficient in the fourth coefficient member 9584 to a value equal to or somewhat smaller than one. To achieve an integrator effect in the integrating controller 95, the output signal S22 from the summator 9582 is fed back to the third setting member 954. The third filter device 944 belonging to the proportional controller is arranged in the same way but in this case the output signal S22 shall not be fed back.

In the event that the fifth filter device 958 is not included in the integrating controller 95, the output signal S21 from the second summator 957 is fed back to the third setting member 954.

For the controller 85 it has been assumed that the disturbance is repetitive with an equalized period time value T′ corresponding to N control pulses S′ for the signal processing in the controller. The output signal of the controller at a certain time shall therefore be based on the value of the disturbance at a time corresponding to N control pulses earlier. Since, in addition, the controller in the shown embodiment is working in sampled mode, it takes one control pulse before a change in the control deviation may arise as a response to a change of the output signal of the controller. The delays in the controller, which correspond to the N−1 control pulses remaining during the equalized time period T′, are distributed as follows. The first filter device 93 is given k delays whereupon the number of delays q1 for the first memory member 942 is obtained as q1=N−1−k and the number of delays q2 for the second memory member 952 as q2=N−1−k, that is, q1=q2. The number of delays q3 in the third memory member 955 is obtained as q3=N−1 in that one control pulse N is used for the feedback to achieve an integrator effect.

The invention is not limited to the embodiments shown but a plurality of variations are feasible within the scope of the inventive concept. The active filter 4 can be connected, both shunt-connected and series-connected related to the disturbance, but also other locations of the active filter, in dependence on the configuration of other circuits included in the network, are possible within the scope of the invention in that transfer functions which take into account the characteristic of intermediate impedances can easily be introduced in, for example, the first filter device 93. The invention is applicable to power networks in general and is not limited to the sensing of the state variables shown in the embodiment.

The connection of the active filter in series connection related to the disturbance corresponds in the embodiments shown to the active filter 4 being either connected in series with the smoothing reactor 54 and adapted to generate, in the connection between the smoothing reactor and the pole terminals of the converter, a voltage counteracting the disturbance contents of the direct voltage Udc of the converter. In the event that a passive shunt filter 55 is connected to the pole line, a series-connected active filter is advantageously connected in series with the pole line, outside the passive shunt filter as viewed from the converter.

The active filter can be connected to the respective pole line and electrode line, either over passive filters arranged at these lines, or over coupling impedances provided for the purpose. The active filter shown in the embodiment may alternatively be connected between the passive filter and the ground of the HVDC plant.

The invention is also applicable to the control of active filters arranged at the harmonic filter 53 shown in FIGS. 3 and 8. With knowledge of the commutating currents Ik and the direct current I1, calculated by means of models of the type illustrated in FIGS. 6 and 7, the phase currents on the a.c. side of the converter can be easily reconstructed and a control signal according to the invention be generated in dependence thereon for control of the active filters arranged at the harmonic filter 53.

Figure 9:
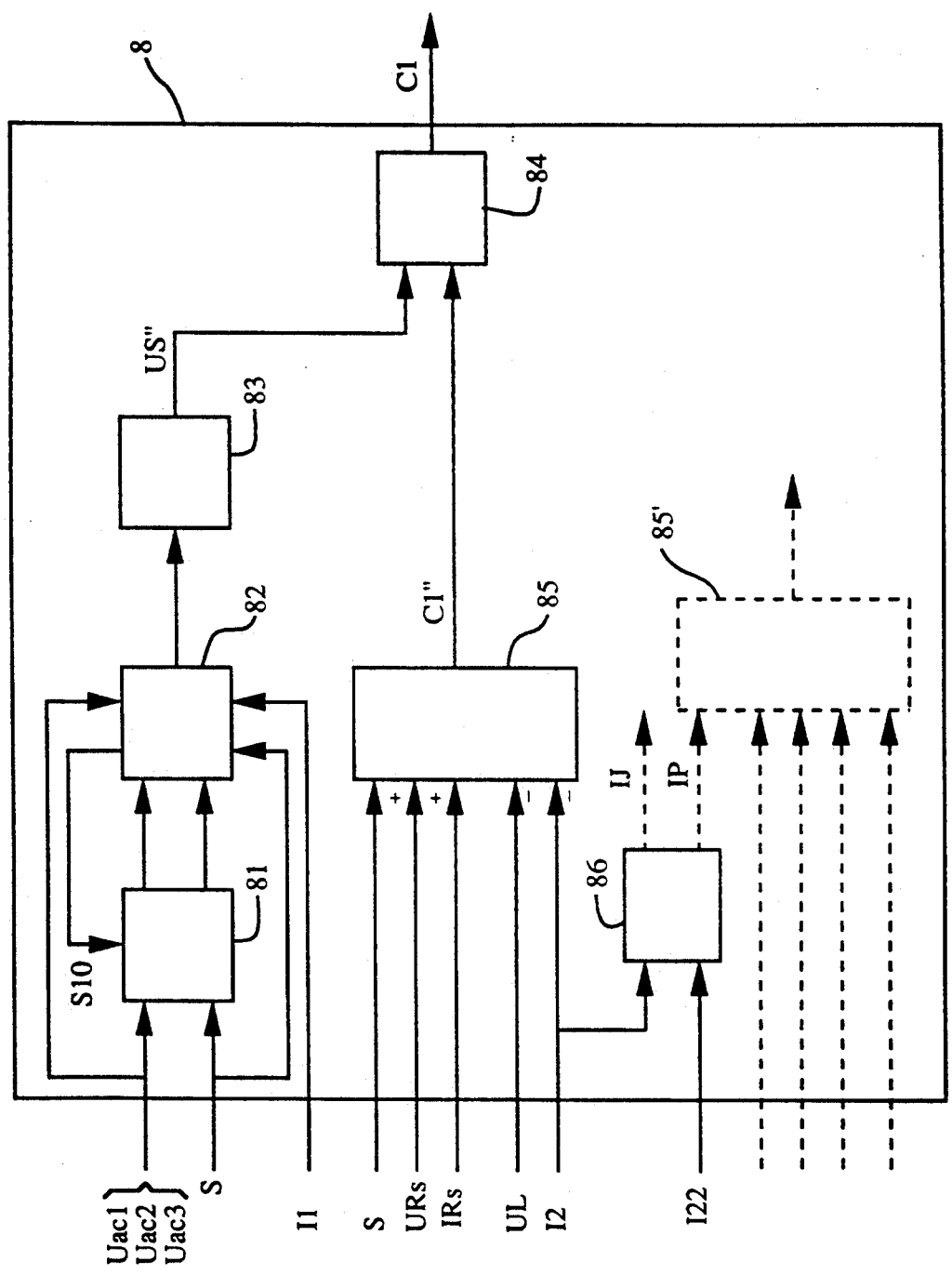
FIG. 9 shows in the form of a block diagram an embodiment of a control member according to the invention in an HVDC station according to FIG. 8.

Especially as regards the embodiment shown, the invention can also be applied to the control of an active filter arranged at the passive filter 56 indicated in FIG. 8 between the electrode line and ground, and be extended to control active filters in a two-pole HVDC plant. In case of feedback control, it is advantageous to transform, in a manner known per se, the fed back currents into one pole mode and one ground mode component, whose disturbance contents are eliminated separately. This is illustrated in FIG. 9 in which a component-transforming member 86 is adapted to transform the sensed pole line currents I2 and a pole line current I22, sensed at the other pole, into one ground mode component IJ and one pole mode component IP. In this case, the ground mode component is adapted to constitute the actual value of the controller 85 whereas the pole mode component is adapted to constitute the actual value of a controller 85' which in FIG. 9 is only indicated in dashed lines. This controller 85', whose output signal is adapted to influence an active filter (not shown in the figure), can be arranged in the same way as described above for the controller 85 but its amplification must normally be adapted to the reflection phenomena in the line which are accentuated for the pole mode. An equivalent signal CE, formed according to the above description, can, of course, also be formed for the purpose of generating a control signal to the active filter which is influenced by the controller 85'.

Figure 2C:
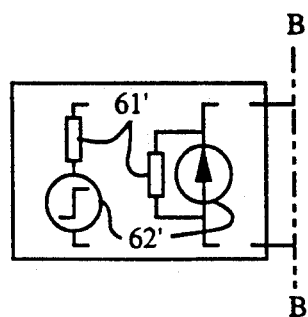

An advantageous embodiment, especially in case of a feedback control, is to form the control deviation from a combination of several sensed state variables. A control deviation DUY1i, associated with each sensed first state variable Y1i, is then formed as the difference between a reference value YRi for the respective state variable and its sensed value Y1i, whereupon the control deviation DU is formed from a combination $DUK = \Sigma Gi * DUY1i$. The coefficients Gi then generally consist of transfer functions. Thus, it is advantageous to sense, in the first section A—A or in the second section B—B, both the voltage of the relevant section and the current which flows through that section and to calculate an equivalent disturbance voltage or disturbance current generator 62 as well as an equivalent internal impedance 61 for the disturbance source, as viewed from the first section A—A, or an equivalent disturbance voltage or disturbance current generator 62' as well as an equivalent internal impedance 61' for the disturbance source, as viewed from the second section B—B. The latter case is illustrated in FIG. 2C. FIG. 10 shows the signal-converting member 90 adapted to receive a value of the pole line current I2 and a value of the voltage UL between the pole line and the electrode line, measured by means of a voltage measuring device 26. The reference member 91 is supplied with a reference value IRs for current and a reference value URs for voltage and is adapted to form a control deviation DU of the form $DU = (URs - UL) + ZI*(IRs - I2)$, where ZI is the value of the equivalent internal impedance 61' of the disturbance source. It has proved that this method generally renders the transfer function from control signal to sensed state variables independent of the properties of that part of the power network which lies between the first section A—A and the second section B—B, respectively, and the output lines. Within the scope of the invention the control deviations can also be formed in accordance with other criteria such that a desired target function for the power network is attained.

It is not necessary for all signal processing in the controller 85 to be controlled by a common pulse train S' generated by the synchronization member 88. Thus, for example, the signal-converting member 90, the reference member 91, the first summator 92, the first filter device 93 and the level control member 97 may be adapted to work asynchronously with the synchronizing pulses S. In other cases, for example when the disturbance source consists of a diode rectifier, the synchronization signal S must be generated from currents and/or voltages sensed in the power network. In the example with a diode rectifier, the discontinuities in the differential coefficient of the output voltage of the diode rectifier, which occur during commutation of the rectifier, may then, for example, be sensed and a pulse generating member be adapted to deliver pulses timely related to these discontinuities. Similarly, within the scope of the inventive concept, at least parts of the control member may be implemented by hard-wired circuits.

The control signal C1 can be formed as a sum of the control signal, generated in dependence on the equivalent signal, and a control signal generated in dependence on the output signal of the controller 85 but also in dependence only on the equivalent signal or in dependence only on the output signal of the controller 85. In the latter case, of course, it is sufficient that the fourth calculating member 84 be adapted to comprise the required signal adaptation members for adaptation between the output signal C1" of the controller and the control signal C1. These signal adaptation members can also be arranged in the controller, in which case the fourth calculating member is completely omitted.

In order to achieve a good elimination of harmonic disturbances with a stable active filtering, the following main principles are used in the proposed solutions:

The repetitive pattern of harmonic disturbances is utilized in feedback control as the non-minimum phase character of the response of the power network excludes stable and quick responding feedback control solutions. The new propose compensation mechanisms for the dynamics of the power network is necessary for stable control with good damping properties.

Two types of filtering are included in the feedback controller. The first type allow damping of the controlling gain at high frequencies without changes in phase shifts. This makes it easy to control the stability of the controller and to set the high frequency limit of the controller. The other type is damping out the control gain at certain frequencies or over certain frequency ranges without affecting the stability. This function is useful when, for example, some harmonic disturbance frequencies with small environmental effects but high damping power demands should be excluded from elimination by feedback control.

Synchronization of the feedback controller in time with the disturbance pattern improves the damping effect when the timescale of the repetitive pattern is changing slowly.

Multiple measurements for feedback control are used as a means of reducing the influence of non-minimum phase in transfer functions but also of reducing the influence of parts in the power network with changing or complicated dynamics. Especially, it is important to exclude the influence of the dynamics of outgoing power lines, which have both delay effects and changing dynamics.

We claim:

1. A method in an electric power network, which network comprises at least one output line and an active filter controllable via a control input, for reducing disturbances on said output line generated by a disturbance source located in or connected to the power network, comprising the steps of:

sensing at least one state variable in the power network and supplying said state variable to a controller;

forming an output signal from the controller in dependence on the control deviation of said at least one state variable form a desired value as a sequence of values repeated with a period T', said values being formed in dependence on the control deviation;

generating a control signal in dependence on the output signal and supplied to the control input; and said step of forming the output signal of the controller including the step of carrying out a transformation dependent on non-minimum phase properties of the transfer function from the output signal of the controller to the control deviation.

2. A method according to claim 1, wherein said step of forming the output signal of the controller further includes the step of low-pass filtering without a phase shift.

3. A method according to claim 1, wherein in said step of generating a control signal certain frequency components in the control signal are reduced or eliminated.

4. A method according to claim 1, further comprising the step of adding to the control deviation a correction value generated in dependence on the accumulated sum of the sequence of values during the period.

5. A method according to claim 1, further comprising the step of temporarily supplying the control input with a noise signal or a harmonic signal for identification of the transfer function from the output signal of the controller to the control deviation.

6. A method according to any one of claims 1, 3, 4, wherein the power network comprises a d.c. line, connected to a converter, for transmission of high-voltage direct current and the converter is connected to a three-phase alternating voltage network, wherein the state variable consists of the current on the d.c. line.

7. A method according to claim 6, further comprising the step of injecting a filter voltage, dependent on the control signal, with reversed polarity in relation to the disturbance voltage occurring across the converter, into a series circuit between the pole line of the d.c. line and the electrode line.

8. A method according to claim 6, further comprising the step of adding a current dependent on the control signal to the direct current of the converter at a point of connection on the d.c. line.

9. A method according to any one of claims 1, 2, 3, wherein the power network comprises a d.c. line, connected to a converter for transmission of high-voltage direct current and the converter is connected to a three-phase alternating voltage network, and the state variable consists of a voltage.

10. A method according to claim 9, further comprising the step of adding a current dependent on the control signal to the direct current of the converter at a point of connection on the d.c. line.

11. A method according to claim 9, further comprising the step of injecting a filter voltage, dependent on the control signal, with reversed polarity in relation to the disturbance voltage occurring across the converter, into a series circuit between the pole line of the d.c. line and the electrode line.

12. A method according to claim 1, further comprising the step of defining a section through the power network such that the control input and the controllable active filter are located on the same side of the section, and the output line is located on the other side of the section, and the step of sensing at least two state variables at the section and the step of forming, for each one of the sensed state variables the deviation from a respective desired value, the step of multiplying the deviations thus formed by a known transfer function associated with the respective state variable, and the step of forming the control deviation from a sum of the thus formed products.

13. A method according to claim 12, wherein at least one of the state variables consists of a current and at least one of the other state variables consists of a voltage, the transfer function associated with the current corresponds to the equivalent impedance of the disturbance source, viewed from the section, and the transfer function associated with the voltage is equal to one.

14. A method according to claim 1, in said step of forming the output signal of the controller the periodic repetition is related in time to a synchronization signal related to the disturbance source.

15. A method according to claim 13, further comprising the step of sensing the time difference between consecutive synchronization signals and forming from the sequence of such time differences an equalized period time value and generating a sequence of control signals with a frequency determined by the quotient between a predetermined number and the equalized period time value.

16. A method according to claim 1, wherein said step of carrying out said transformation and the transfer function thereof multiplied by the transfer function from the output signal of the controller to the control deviation with respect to the time properties substantially results in a time delay.

17. A method according to claim 16, wherein the power network comprises a d.c. line, connected to a converter for transmission of high-voltage direct current and the converter is connected to a three-phase alternating voltage network, and the state variable consists of the current on the d.c. line.

18. A method according to claim 16, wherein the power network comprises a d.c. line connected to a converter for transmission of high-voltage direct current and the converter is connected to a three-phase alternating voltage network, and the state variable consists of a voltage.

19. A method according to claim 17, further comprising the step of reducing or eliminating certain frequency components in the control signal.

20. A method according to claim 17, wherein said step of forming the output signal of the controller includes the step of low pass filtering without phase shift.

21. A method according to claim 18, characterized in that when forming the output signal of the controller, a low-pass filtering without phase shift is carried out.

22. A method according to claim 18, further comprising the step of reducing or eliminating certain frequency components in the control signal.

23. A method according to any one of claims 17 or 20, further comprising the step of injecting a filter voltage, dependent on the control signal, with reversed polarity in relation to the disturbance voltage occurring across the converter, into a series circuit between the pole line of the d.c. line and the electrode line.

24. A method according to claim 23, in said step of forming the output signal of the controller the periodic repetition is related in time to a synchronization signal related to the disturbance source.

25. A method according to any one of claims 17 or 18, further comprising the step of adding a current dependent on the control signal to the direct current of the converter at a point of connection on the d.c. line.

26. A method according to claim 25, in said step of forming the output signal of the controller the periodic repetition is related in time to a synchronization signal related to the disturbance source.

27. A device in an electric power network (1), comprising at least one output line (31, 32) and an active filter (4) controllable via a control input (41), for reducing on the output line (31, 32) disturbances generated by a disturbance source (6) located in or connected to the power network, at least one state variable (Y2i) being sensed in the power network (1) and a controller forming, in dependence on the control deviation (DU) of the state variable (Y2i) from a desired value (Y2iR), an output signal (C1") as a sequence (SC14) of values (C14n) repeated with a period (T'), the values (C14n) being formed in dependence on the control signal (C1"), a control signal (C1) which is supplied to the control input (41), wherein the controller comprises a filter device (93) for carrying out a transformation dependent on non-minimum phase properties of the transfer function (F1') from the output signal (C1") of the controller to the control deviation (DU).

28. A device according to claim 27, wherein the periodic repetition of the output signal (C1") of the controller is related in time to a synchronization signal (S) related to the disturbance source, wherein the controller comprises a synchronization member (88) to sense the time difference between consecutive synchronization signals (S) and to form from the sequence of these time differences an equalized period time value (T') and to generate a sequence of control signals (S') with a frequency determined by the quotient between a predetermined number (N) and the equalized period time value (T').

29. A device according to claim 27, wherein the controller comprises a level control member (97) to form, during the period (T'), the accumulated sum of the output signal (C1") of the controller and, at the end of each period (T'), to generate a correction (DUC), formed in dependence on said sum, to be added to the control deviation (DU).

30. A device according to claim 27, wherein the filter device (93) comprises at least one compensating filter (931), in which each of the compensating filters (931) is cascade-connected to a delay filter (932) which comprises a second settable coefficient member (9324) as well as at least one group comprising a first settable coefficient member (9321), a delay member (9322) and a summator (9323), the delay of the delay member (9322) corresponding to the time between two control signals (S'), the first coefficient member (9321) and the second coefficient member (9324) being supplied with the input signal (S11') of the delay filter (932), the summator (9323) being supplied with the output signals from the first coefficient member (9321) and from the delay member (9322), and the delay member (9322), in the event said group is cascade-connected to another group comprised in the delay filter (932), being supplied with the output signal from the summator (9323) and otherwise with the output signal from the second coefficient member (9324).

31. A device according to claim 27, wherein a section (B—B) through the power network (1) is defined such that the control input (41) and the controllable active filter (4) and the output line (31, 32), respectively, are located on separate sides of the section (B—B) and at least two state variables (Y2i) are sensed at the section (B—B), wherein the controller comprises a reference number (91) to form, for each one of the sensed state variables (Y2i), its deviation (DUY2i) from its respective desired value (YRi), to multiply the deviations (DUY2i) thus formed by a known transfer function (Gi) associated with the respective state variable (Y2i), and to form the control deviation (DU) from a sum (DUK) of the thus formed products (Gi*DUY2i).

32. A device according to claim 31, wherein at least one of the state variables (Y2i) consists of a current (I2) and at least one of the state variables (Y2i) consists of a voltage (UL), wherein the transfer function associated with the current (I2) corresponds to the equivalent impedance (62') of the disturbance source (6), viewed from the section (B—B), and wherein the transfer function associated with the voltage (UL) is equal to one.

33. A device according to claim 27, wherein the controller comprises a filter device (943, 953, 956) for carrying out a low-pass filtering without phase shift.

34. A device according to claim 27, wherein the controller comprises a filter device (944, 958) for reducing or eliminating certain frequency components in the output signal (C1") of the controller.

35. A device according to claim 33, wherein the signal (S13(t)) which is to be low-pass filtered without phase shift constitutes an output signal from a memory member (942) which comprises at least one delay element (9421), arranged at the output of the memory member, with a delay corresponding to the time between two control signals (S'), wherein the filter device (943) comprises at least one delay element (9431) with a delay corresponding to the time between two control signals (S'), at least two first settable coefficient members (9432), at least one second settable coefficient member (9433) and a summator (9434), one of the first coefficient members (9432) and the delay element (9431) being supplied with the output signal (S13(t)) from the memory member (942) and another one of the first coefficient members (9432) being supplied with the output signal (S13(t−1)) from the memory member (942) sensed before the delay element (9421) comprised in the memory (942), the second coefficient member (9433) being supplied with the output signal (S13(t+1)) from the delay element (9431) comprised in the filter device (943) and the summator (9434) being supplied with the output signals from said coefficient members.

36. A device according to claim 34, wherein the filter device (958) comprises a pass filter (9581) which is pervious to at least one frequency component of the signal supplied to the pass filter (9581), a summator (9582) which is supplied with the input signal (S21) of the filter device (958) as well as at least a part of the output signal from the pass filter (9581) with reversed sign, and a summator (9583) which is supplied with the output signal from the pass filter (9581) with reversed sign and the output signal from the second summator.

37. A device according to any one of claims 27, 33, 34, wherein the power network (1) comprises a d.c. line (51, 52) connected to a converter (6) for transmission of high-voltage direct current and the converter (6) is connected to a three-phase alternating voltage network (2), wherein the state variable (Y2i) consists of the current (I2) on the d.c. line (51, 52).

38. A device according to any one of claims 27, 33, 34, wherein the power network (1) comprises a d.c. line (51, 52) connected to a converter (6) for transmission of high-voltage direct current and the converter (6) is connected to a three-phase alternating voltage network (2), wherein the state variable (Y2i) consists of a voltage (UL).

39. A device according to claim 27, wherein the transfer function for the filter device (93) multiplied by the transfer function (F1′) from the output signal (C1″) of the controller to the control deviation (DU) with respect to time properties substantially constitutes a time delay.

40. A device according to claim 39, wherein the power network (1) comprises a d.c. line (51, 52) line connected to a converter (6) for transmission of high-voltage direct current and the converter (6) is connected to a three-phase alternating voltage network (2), wherein the state variable (Y2i) consists of the current (I2) on the d.c. line (51, 52).

41. A device according to claim 40, wherein the controller comprises a filter device (944, 958) for reducing or eliminating certain frequency components in the output signal (C1″) of the controller.

42. A device according to claim 41, wherein the filter device (958) comprises a pass filter (9581) which is pervious to at least one frequency component of the signal supplied to the pass filter (9581), a summator (9582) which is supplied with the input signal (S21) of the filter device (958) as well as at least a part of the output signal from the pass filter (9581) with reversed signal, and a summator (9583) which is supplied with the output signal from the pass filter (9581) with reversed sign and the output signal from the second summator.

43. A device according to claim 40, wherein the controller comprises a filter device (943, 953, 956) for carrying out a low-pass filtering without phase shift.

44. A device according to claim 43, wherein the signal (S13(t)) which is to be low-pass filtered without phase shift constitutes an output signal from a memory member (942) which comprises at least one delay element (9421), arranged at the output of the memory member, with a delay corresponding to the time between two control signals (S′), wherein the filter device (943) comprises at least one delay element (9431) with a delay corresponding to the time between two control signals (S′), at least two first settable coefficient members (9432), at least one second settable coefficient member (9433) and a summator (9434), one of the first coefficient members (9432) and the delay element (9431) being supplied with the output signal (S13(t)) from the memory member (942) and another one of the first coefficient members (9432) being supplied with the output signal (S13(t−1)) from the memory member (942) sensed before the delay element (9421) comprised in the memory member (942), the second coefficient member (9433) being supplied with the output signal (S13(t+1)) from the delay element (9431) comprised in the filter device (943) and the summator (9434) being supplied with the output signals from said coefficient members.

45. A device according to claim 39, wherein the power network (1) comprises a d.c. line (51, 52) connected to a converter (6) for transmission of high-voltage direct current and the converter (6) is connected to a three-phase alternating voltage network (2), wherein the state variable (Y2i) consists of a voltage (UL).

46. A device according to claim 45, wherein the controller comprises a filter device (944, 958) for reducing or eliminating certain frequency components in the output signal (C1″) of the controller.

47. A device according to claim 46, wherein the filter device (958) comprises a pass filter (9581) which is pervious to at least one frequency component of the signal supplied to the pass filter (9581), a summator (9582) which is supplied with the input signal (S21) of the filter device (958) as well as at least a part of the output signal from the pass filter (9581) with reversed sign, and a summator (9583) which is supplied with the output signal from the pass filter (9581) with reversed sign and the output signal from the second summator.

48. A device according to claim 45, wherein the controller comprises a filter device (943, 953, 956) for carrying out a low-pass filtering without phase shift.

49. A device according to claim 48, wherein the signal (S13(t)) which is to be low-pass filtered without phase shift constitutes an output signal from a memory member (942) which comprises at least one delay element (9421), arranged at the output of the memory member, with a delay corresponding to the time between two control signals (S′), wherein the filter device (943) comprises at least one delay element (9431) with a delay corresponding to the time between two control signals (S′), at least two first settable coefficient members (9432), at least one second settable coefficient member (9433) and a summator (9434), one of the first coefficient members (9432) and the delay element (9431) being supplied with the output signal (S13(t)) from the memory member (942) and another one of the first coefficient members (9432) being supplied with the output signal (S13(t−1)) from the memory member (942) sensed before the delay element (9421) comprised in the memory member (942), the second coefficient member (9433) being supplied with the output signal (S13(t+1)) from the delay element (9431) comprised in the filter device (943) and the summator (9434) being supplied with the output signals from said coefficient members.

* * * * *